US012571699B2

(12) United States Patent
Peeler et al.

(10) Patent No.: US 12,571,699 B2
(45) Date of Patent: Mar. 10, 2026

(54) SYSTEMS AND METHODS FOR PROVIDING A VOLUMETRIC DETECTION SYSTEM

(71) Applicant: Zaxis, Inc., West Valley City, UT (US)

(72) Inventors: Scott C. Peeler, West Valley City, UT (US); John Zachary Peeler, West Valley City, UT (US); William Dunkley, West Valley City, UT (US); Christopher H. Jensen, West Valley City, UT (US); Steven Guest, West Valley City, UT (US)

(73) Assignee: Zaxis, Inc., Salt Lake City, UT (US)

( * ) Notice: Subject to any disclaimer, the term of this patent is extended or adjusted under 35 U.S.C. 154(b) by 367 days.

(21) Appl. No.: 18/243,861

(22) Filed: Sep. 8, 2023

(65) Prior Publication Data

US 2024/0085266 A1 Mar. 14, 2024

Related U.S. Application Data

(60) Provisional application No. 63/405,346, filed on Sep. 9, 2022.

(51) Int. Cl.
*G01M 3/32* (2006.01)
(52) U.S. Cl.
CPC ........ *G01M 3/3218* (2013.01); *G01M 3/3209* (2013.01); *G01M 3/3281* (2013.01)
(58) Field of Classification Search
CPC . G01M 3/3218; G01M 3/3209; G01M 3/3281
See application file for complete search history.

(56) References Cited

U.S. PATENT DOCUMENTS

| | | | | | |
|---|---|---|---|---|---|
| 3,987,664 | A | * | 10/1976 | Hass | G01M 3/3281 |
| | | | | | 73/49.8 |
| 5,333,492 | A | * | 8/1994 | Aarts | G01M 3/3218 |
| | | | | | 73/49.3 |
| 6,330,822 | B1 | * | 12/2001 | Hawk | G01M 3/20 |
| | | | | | 73/40 |
| 7,559,231 | B2 | | 7/2009 | Kanematsu et al. | |
| 2001/0035046 | A1 | | 11/2001 | Williams | |
| 2009/0314107 | A1 | * | 12/2009 | Yakimoski | G01N 3/08 |
| | | | | | 73/865.6 |

(Continued)

FOREIGN PATENT DOCUMENTS

WO 2022013211 A1 1/2022

*Primary Examiner* — Francis C Gray
(74) *Attorney, Agent, or Firm* — David B. Tingey; K. Russell Griggs; Kirton McConkie

(57) ABSTRACT

A volumetric detection system (or leak tester) is disclosed herein. While the system can have any suitable feature, in some cases, it includes a displacement mechanism (such as a programmable stepper motor), a controllable element (such as a piston) that is coupled to the displacement mechanism, a containment chamber that receives a portion of the controllable element, a sensing unit (or sensor) that is configured to measure a backpressure from a device that is being tested, a computational unit (or processor) that is configured to determine a placement of the controllable element within the chamber, and a coupler (or attachment mechanism) that is configured to couple to the device that is to be tested. In some cases, the system functions without being coupled to a compressed air source. Other implementations are described.

14 Claims, 9 Drawing Sheets

(56)                   References Cited

U.S. PATENT DOCUMENTS

| | | | |
|---|---|---|---|
| 2013/0199274 A1 | 8/2013 | Yamamoto et al. | |
| 2019/0033163 A1* | 1/2019 | Wetzig ................ | G01M 3/3218 |
| 2021/0338245 A1 | 11/2021 | Certus | |

* cited by examiner

10

SYSTEMS AND METHODS FOR PROVIDING A VOLUMETRIC DETECTION SYSTEM

CROSS-REFERENCE TO RELATED APPLICATION

This application claims priority to U.S. Provisional Patent Application Ser. No. 63/405,346, filed Sep. 9, 2022, and entitled "SYSTEMS AND METHODS FOR PROVIDING A VOLUMETRIC LEAK TESTER FOR BALLOON CATHETERS"; the entire disclosures of which is hereby incorporated by reference.

FIELD

The described systems and methods relate to product quality control. More particularly, some implementations of the described systems and methods relate to a volumetric detection system that is configured to generate pressure by displacing a volume of an internal space in a containment chamber and using the generated pressure to inflate and/or otherwise test one or more products (e.g., balloon catheters and/or any other products that are supposed to be substantially gas impermeable) for leaks, ingress egress, pressure decay, mass flow, changes in volume, changes in pressure, check valve opening pressure with peak hold, specification verification, specification validation, and/or any other suitable characteristic. While the described volumetric detection system can have any suitable feature, in some cases, it includes one or more containment chambers that each have an internal space; displacement mechanisms (e.g., programmable stepper motors, servos, pumps, and/or any other suitable actuating mechanisms that can be actuated to modify a volume of the chamber's internal space); controllable elements (e.g., pistons that are coupled to the displacement mechanism and that are configured to be moved within the containment chamber to selectively and precisely modify the volume of the containment chamber's internal space); sensing units (e.g., sensors) that are configured to measure a pressure of the chamber's internal space, a backpressure from a device that is being tested, a volume of the internal space in the containment chamber, and/or any other variable related to an internal condition of the containment chamber and/or a condition of a device being tested; computational units (e.g., processors) that (among other things) are configured to determine a current volume of the internal space of the chamber (e.g., based on placement of the piston within the chamber), and/or an attachment mechanism or coupler that is configured to couple to the device that is to be tested. In some cases, the described detection unit (or tester) functions without being coupled to an external compressed air source (e.g., an air compressor or shop air source). Thus, in some cases, the detection system can be considered to be "airless".

BACKGROUND AND RELATED ART

Quality control (e.g., specification verification/validation) is a process by which a person and/or a machine reviews the quality of a product to discover any defects that may affect the quality, aesthetic appeal, usable-life, and/or functionality of the product. While quality control procedures for products can test for a wide variety of aspects or features, some quality control testing procedures include visually inspecting a product to identify one or more defects in the product, such as cracks, holes, malformations, and blemishes.

In some cases, one or more products that are to be subjected to quality control comprise a flexible portion that is substantially impermeable to air and that is intended to be inflated and/or to otherwise used to form a barrier to a fluid, such as air. While visual inspection can often be used to identify defects in such products, in some cases, it is helpful to inflate the products and to test them for leaks.

Although there are some systems for testing for leaks in inflatable products (e.g., balloon catheters), such systems are not without their shortcomings. Indeed, some conventional systems for testing for leaks are not self-contained and can require external air sources, shop air, compressors, and/or other items that force air into such systems. Additionally, some conventional systems for testing leaks in gas impermeable (or substantially impermeable) products are relatively imprecise and, as such, may not be able to readily identify minute leaks in the products being tested. Moreover, in some cases, some conventional systems for checking for leaks in a product are capable of only testing a single product at a time. As a result, some such systems can be relatively slow and can thereby act as a rate limiting step in a quality control process.

Thus, while a wide variety of systems exist for checking for leaks in gas-impermeable (or substantially impermeable) products (e.g., balloon catheters), challenges can still exist with such systems, including those challenges listed above. Accordingly, it would be an improvement in the art to augment or even replace current techniques with other techniques.

SUMMARY OF THE INVENTION

The described systems and methods relate to product quality control. More particularly, some implementations of the described systems and methods relate to a volumetric detection system that is configured to generate pressure by displacing a volume of an internal space in a containment chamber and using the generated pressure to inflate and/or otherwise test one or more products (e.g., balloon catheters and/or any other products that are supposed to be substantially gas impermeable) for leaks, ingress egress, pressure decay, mass flow, changes in volume, changes in pressure, check valve opening pressure with peak hold, specification verification, specification validation, and/or any other suitable characteristic. While the described volumetric detection system can have any suitable feature, in some cases, it includes one or more containment chambers that each have an internal space; displacement mechanisms (e.g., programmable stepper motors, servos, pumps, and/or any other suitable actuating mechanisms that can be actuated to modify a volume of the chamber's internal space); controllable elements (e.g., pistons that are coupled to the displacement mechanism and that are configured to be moved within the containment chamber to selectively and precisely modify the volume of the containment chamber's internal space); sensing units (e.g., sensors) that are configured to measure a pressure of the chamber's internal space, a backpressure from a device that is being tested, a volume of the internal space in the containment chamber, and/or any other variable related to an internal condition of the containment chamber and/or a condition of a device being tested; computational units (e.g., processors) that (among other things) are configured to determine a current volume of the internal space of the chamber (e.g., based on placement of the piston within the chamber), and/or an attachment mechanism or coupler that is configured to couple to the device that is to be tested. In some cases, the described detection unit (or tester) functions without being coupled to an external compressed air source (e.g., an air compressor or shop air source).

While the described systems and methods may be particularly useful for testing balloon catheters (including, without limitation, balloon catheters used for angioplasty, balloon septostomy, cardiac catheterization, tuboplasty, uterine catheterization, pyeloplasty, and/or any other suitable procedure; over the wire balloon catheters; rapid exchange balloon catheters; Foley catheters; and/or any other suitable type of balloon catheter or catheters), in some cases, the described detection system are used to test any other suitable object for leaks and/or for any other suitable characteristic. Indeed, in some implementations, the described volumetric detector system (or leak tester) is used to: identify a leak, identify an occlusion, measure pressure decay, measure mass flow, measure check valve opening pressure with peak hold, identify ingress, identify egress, identify changes of volume, identify changes of pressure, verify a specification, validate a specification, and/or to perform any other suitable quality control test on one or more condoms, sealed packages, flexible items, and/or any other suitable product that can be inflated. In still other implementations, the described detection system is configured to test one or more non-inflatable items, non-flexible items, fixed-volume items, and/or any other suitable items for leaks, including, without limitation, one or more watches, phones, portable memory devices, devices that are supposed to be waterproof, and/or any other suitable products.

These and other features and advantages of the described systems and methods will be set forth or will become more fully apparent in the description that follows and in the appended claims. The features and advantages may be realized and obtained by means of the instruments and combinations particularly pointed out in the appended claims. Furthermore, the features and advantages of the described systems and methods may be learned by the practice thereof or will be obvious from the description and drawings, as set forth hereinafter.

BRIEF DESCRIPTION OF THE DRAWINGS

In order that the manner in which the above-recited and other features and advantages of the described systems and methods are obtained, a more particular description of such systems and methods will be rendered by reference to specific embodiments thereof, which are illustrated in the appended drawings. Understanding that the drawings are not necessarily drawn to scale or in proper proportion, and that the drawings depict only some illustrative embodiments of the described systems and methods and are not, therefore, to be considered as limiting in scope, the described systems and methods will be described and explained with additional specificity and detail through the use of the accompanying drawings in which.

4

Figure 5:
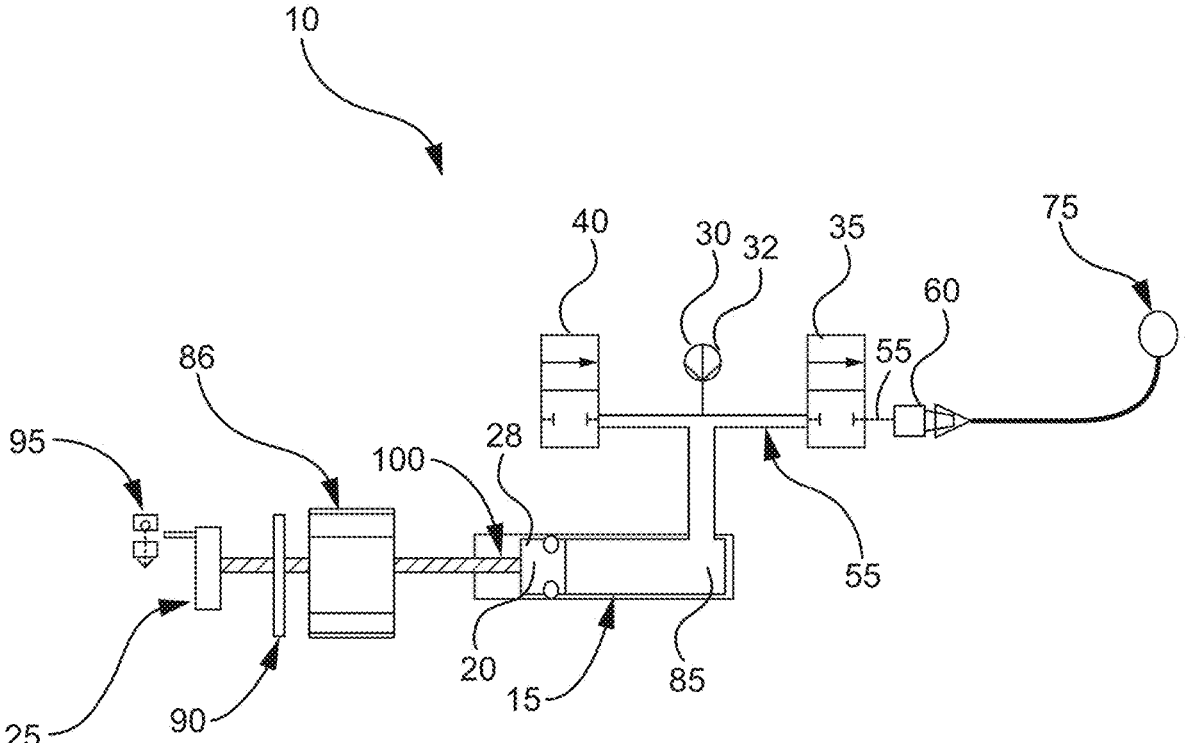
Figure 6:
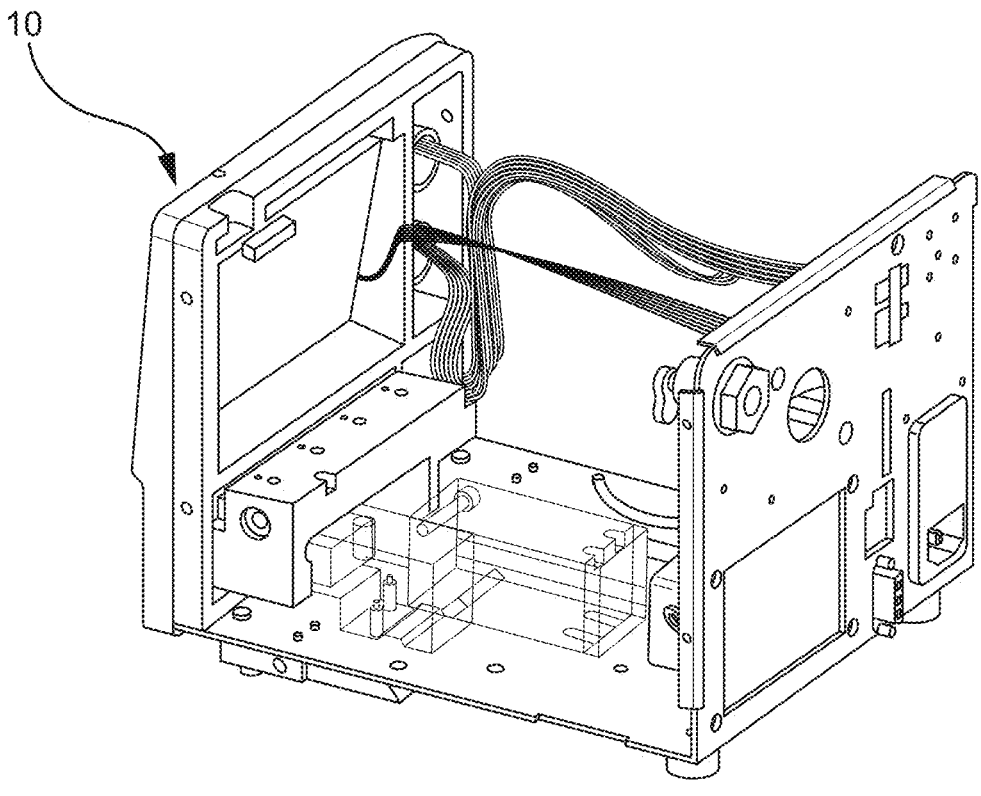
Figure 7:
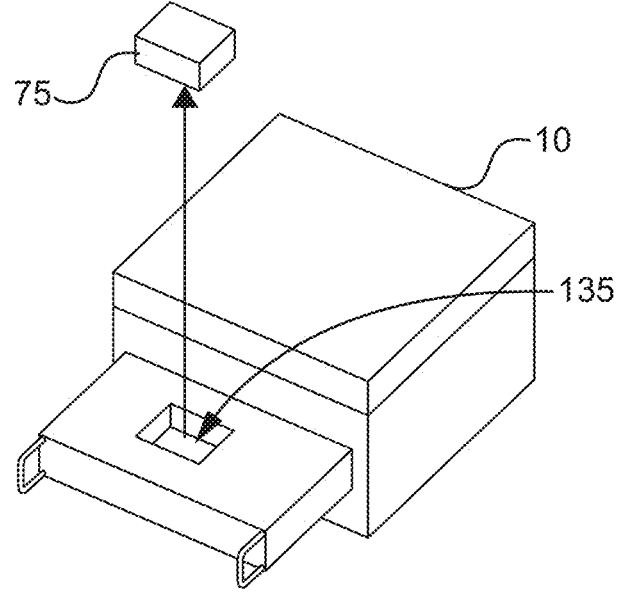
Figure 8:
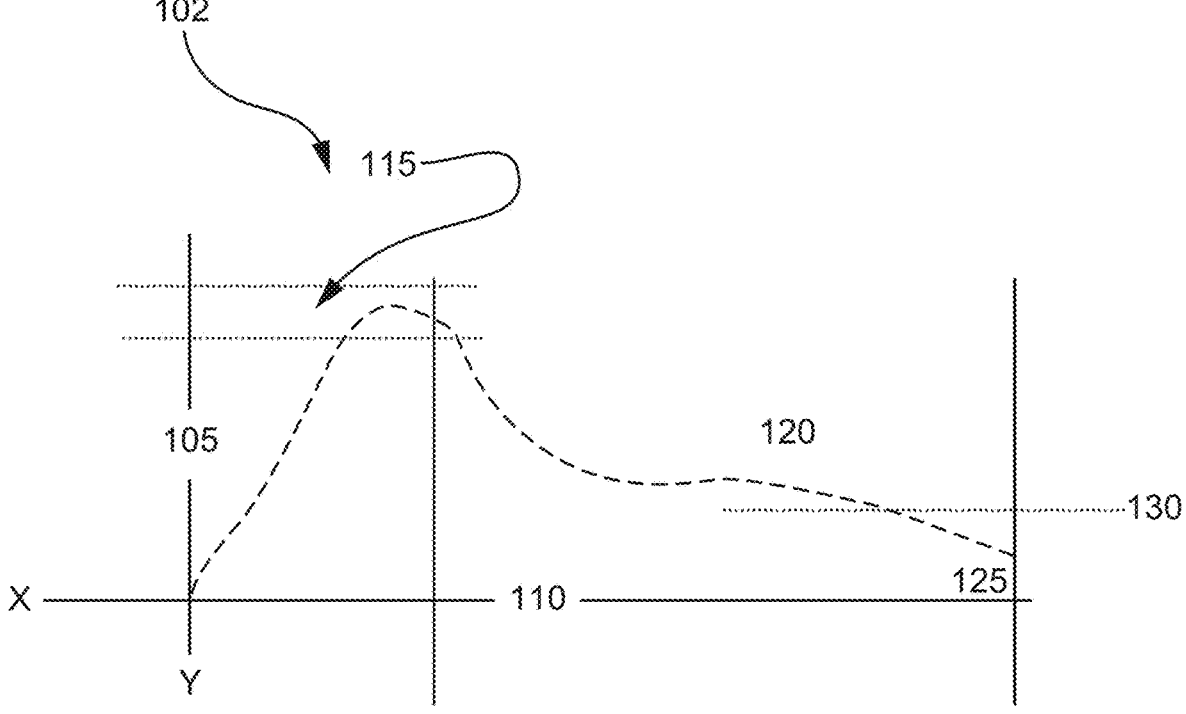
Figure 9:
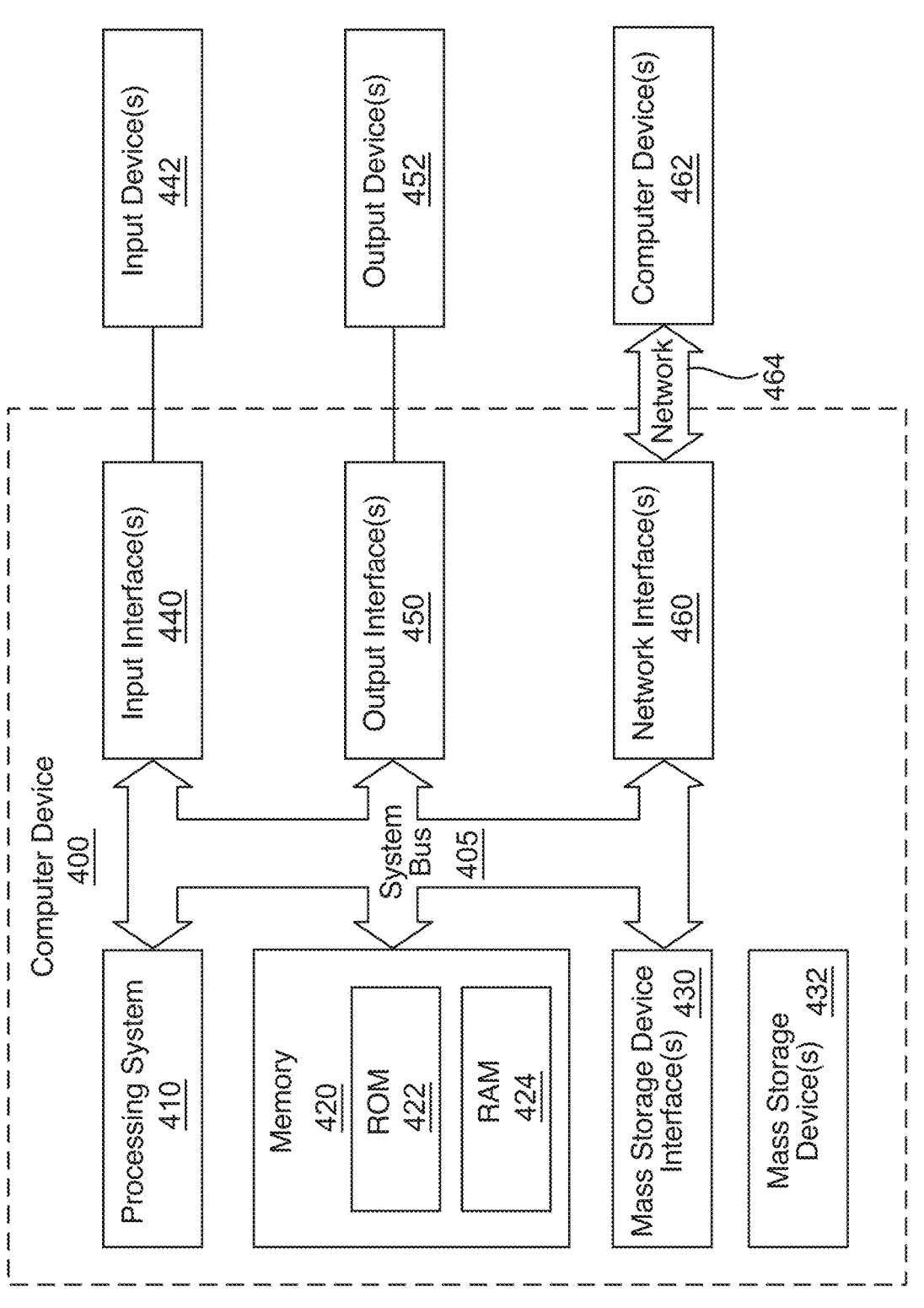
Figure 10:
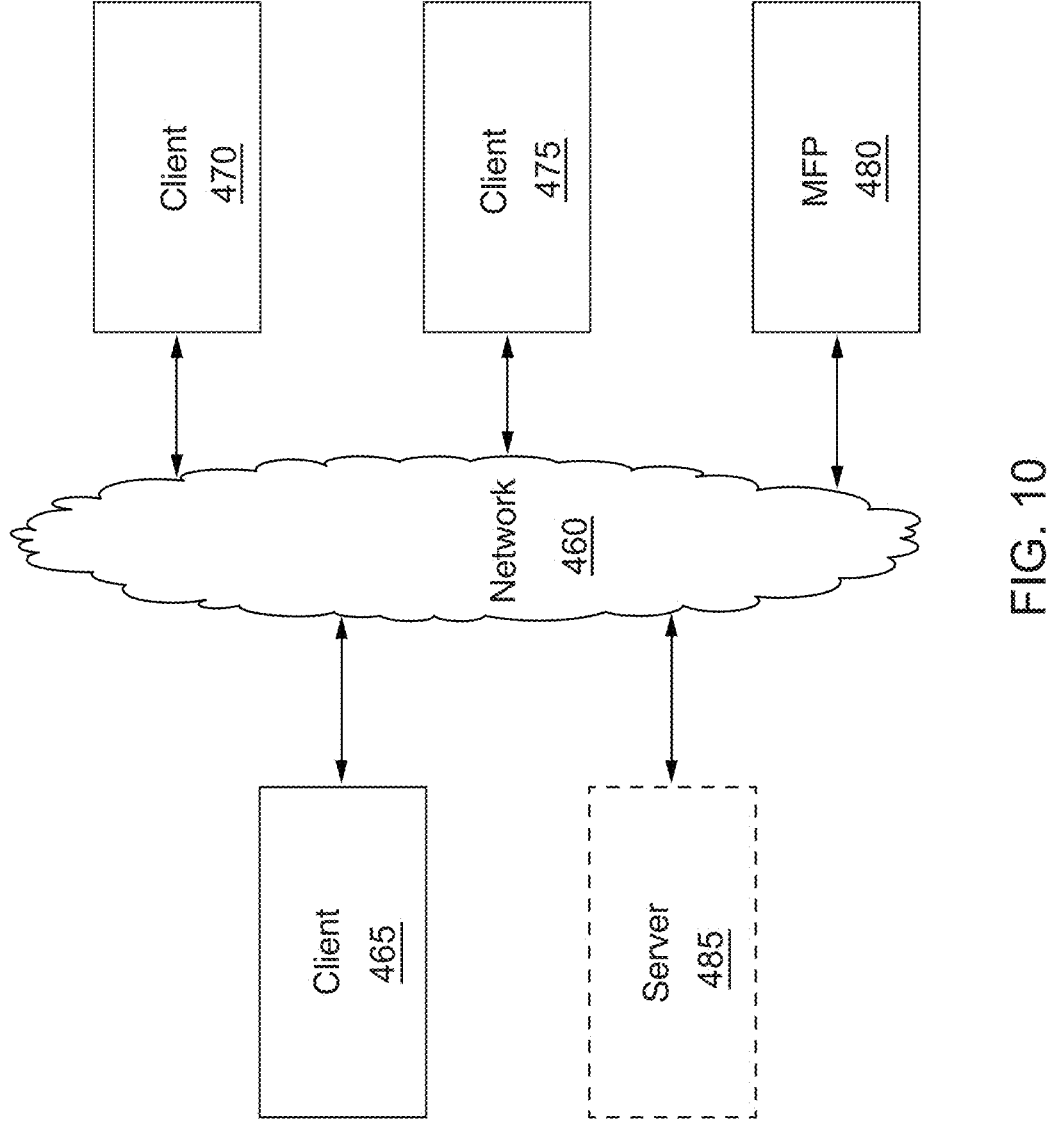
Figure 11:
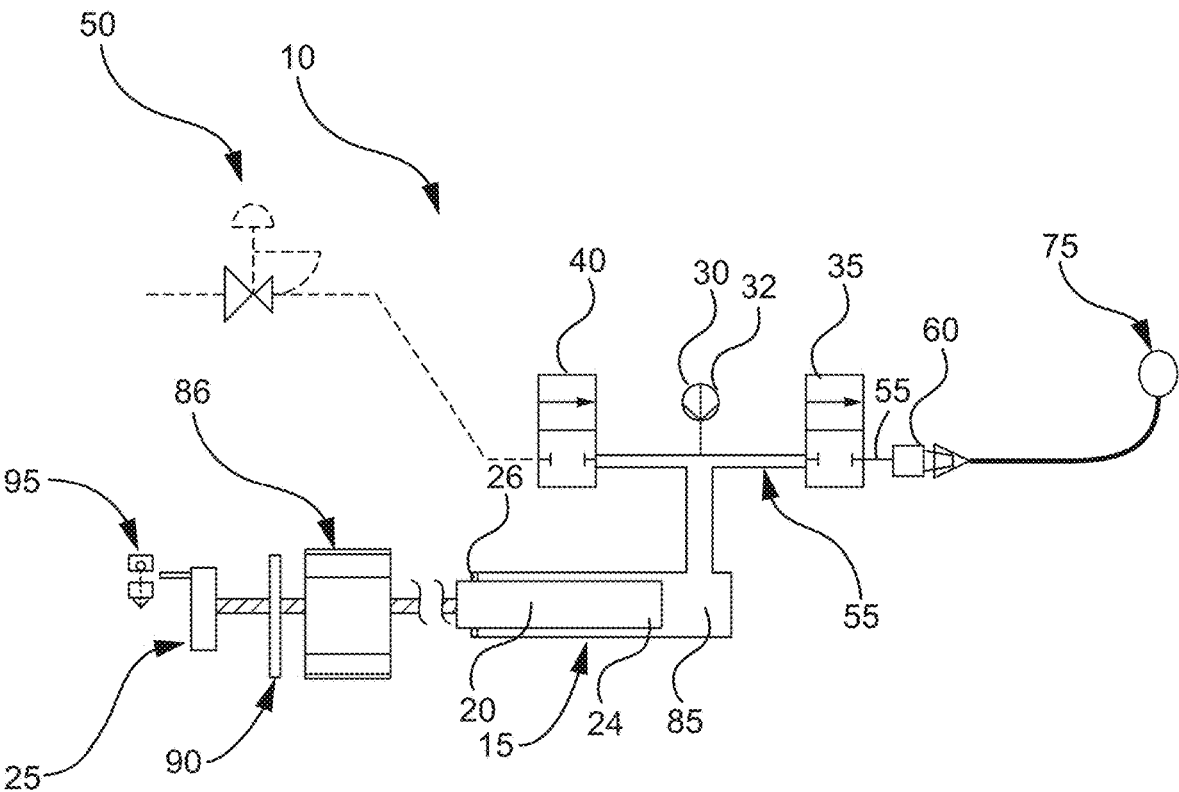

FIG. 5 illustrates a schematic of the volumetric detection system comprising a vent valve, in accordance with a representative embodiment;

FIG. 6 illustrates a perspective view of the volumetric detection system having a cover removed, in accordance with a representative embodiment;

FIG. 7 illustrates a perspective view of a container having a set internal volume for receiving a device that is to be tested, in accordance with a representative embodiment;

FIG. 8 illustrates a graph depicting a waveform of pressure showing backpressure measurements from the volumetric detection system over time, in accordance with a representative embodiment;

FIG. 9 illustrates a representative system that provides a suitable operating environment for use with some embodiments of the described system;

FIG. 10 illustrates a representative embodiment of a networked system that provides a suitable operating environment for use with some embodiments of the described system; and FIG. 11 illustrates a schematic of the volumetric detection system, in accordance with a representative embodiment.

DETAILED DESCRIPTION

The described systems and methods relate to product quality control. More particularly, some embodiments of the described systems and methods relate to a volumetric detection system that is configured to generate pressure by displacing a volume of an internal space in a containment chamber and using the generated pressure to inflate and/or otherwise test one or more products (e.g., balloon catheters and/or any other products that are supposed to be substantially gas impermeable) for leaks, ingress egress, pressure decay, mass flow, changes in volume, changes in pressure, check valve opening pressure with peak hold, specification verification, specification validation, and/or any other suitable characteristic. While the described volumetric detection system can have any suitable feature, in some cases, it includes one or more containment chambers that each have an internal space; displacement mechanisms (e.g., programmable stepper motors, servos, pumps, and/or any other suitable actuating mechanisms that can be actuated to modify a volume of the chamber's internal space); controllable elements (e.g., pistons that are coupled to the displacement mechanism and that are configured to be moved within the containment chamber to selectively and precisely modify the volume of the containment chamber's internal space); sensing units (e.g., sensors) that are configured to measure a pressure of the chamber's internal space, a backpressure from a device that is being tested, a volume of the internal space in the containment chamber, and/or any other variable related to an internal condition of the containment chamber and/or a condition of a device being tested; computational units (e.g., processors) that (among other things) are configured to determine a current volume of the internal space of the chamber (e.g., based on placement of the piston within the chamber), and/or an attachment mechanism or coupler that is configured to couple to the device that is to be tested. In some cases, the described detection unit (or tester) functions without being coupled to an external compressed air source (e.g., an air compressor or shop air source).

The following disclosure of the present invention is grouped into two subheadings, namely "Representative Volumetric Detection System" and "Representative Operating Environment". The utilization of the subheadings is for the convenience of the reader only and is not to be construed as limiting in any sense.

Representative Volumetric Detection System

Figure 1:
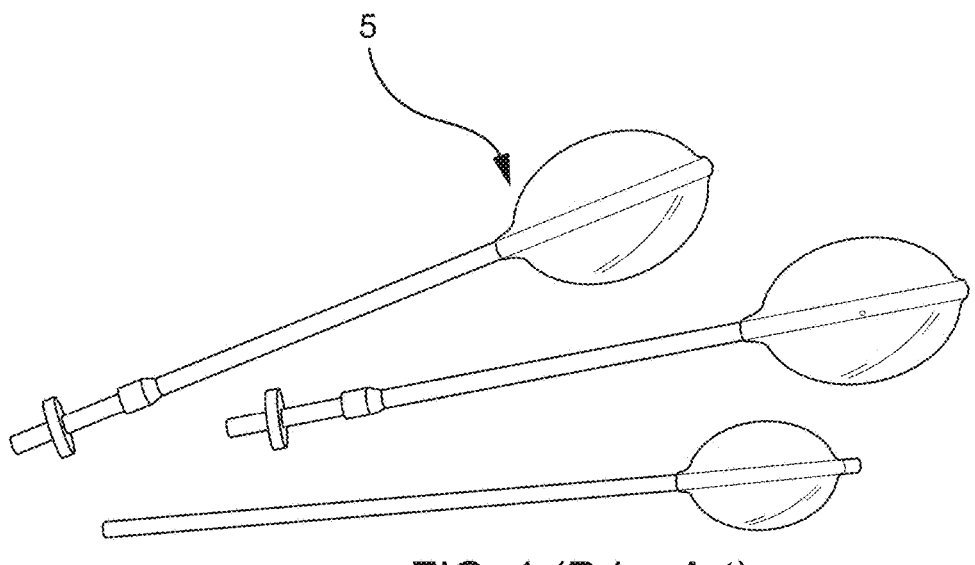
FIG. 1 (prior art) depicts a perspective view of representative embodiments of some conventional balloon catheters.

In accordance with some embodiments, the described systems are configured to test for leaks, ingress, egress, pressure decay, mass flow, changes in volume, changes in pressure, check valve opening pressure with peak hold, specification verification, specification validation, and/or any other suitable characteristic in any suitable device, including, but not limited to, one or more balloon catheters (including, without limitation, balloon catheters used for angioplasty, balloon septostomy, cardiac catheterization, tuboplasty, uterine catheterization, pyeloplasty, and/or any other suitable procedure; over the wire balloon catheters; rapid exchange balloon catheters; Foley catheters; and/or any other suitable type of balloon catheter), condoms, sealed packages, IV lines, IV connectors, connectors, valves, syringes, bags, flexible items, fixed volume items, adjustable volume items, and/or any other suitable product that can be inflated and/or otherwise tested (e.g., for leaks). In some other embodiments, the described systems are configured to identify one or more occlusions in a lumen, open port device (e.g., a multi-lumen catheter), bag spike, and/or in any other suitable device having one or more lumens that open to ambient air and/or that are in fluid communication with an inflatable object (e.g., a balloon). In still other embodiments, the described systems are configured to test for leaks in (and/or any other suitable characteristic of) devices that have a known volume, including, without limitation, one or more water-proof watches, water-proof phones, non-flexible items, digital media storage devices, and/or any other suitable device. In some embodiments, however, the described volumetric detection system (or leak tester) is configured to test for leaks (and/or any other suitable characteristic) in any suitable type of balloon catheter 5 (e.g., as shown in FIG. 1).

While some conventional systems that are used to test for leaks in inflatable devices are in fluid communication during at least a portion of the testing process with one or more sources of compressed air or gas (e.g., shop air, compressed air, a compressed air (or gas) tank in which the internal volume of the tank does not decrease to increase pressure of the air, and/or any other suitable source of compressed air), some embodiments of the described volumetric detection system are configured to test for leaks, occlusions, and/or any other suitable characteristic without requiring an external source of compressed air (or any other suitable gas). Indeed, in some embodiments, the described volumetric detection system generates pressure by way of very precise and programmable volume displacement to determine whether a device that is being tested has any leaks and/or occlusions in it. Thus, as some embodiments of the described system function without an external source of compressed or forced air (and/or another gas that is provided to a chamber of the described tester at a pressure that is above standard atmospheric pressure (e.g., 1 atmosphere or atm), some embodiments of the described volumetric detection system can be described as being "airless".

While the described volumetric detection system (or, leak tester, tester or system) 10 can comprise any suitable component, FIGS. 2-5 show that, in some embodiments, the system 10 comprises one or more containment chambers 15, displacement mechanisms 25, controllable elements 20, sensing units (or sensors) 30, valves (e.g., testing valves 35, pre-charge valves 40, vent valves 45, and/or any other suitable type of valves), pressure controllers 50, conduits 55 comprising a dead volume, couplers (or attachment mechanisms) 60, computational units or processors 65, displays 70, devices 75 to be tested, manifolds 80, and/or any other suitable component.

In this regard, while the described volumetric detection system 10 can function in any suitable manner, in some embodiments, displacement mechanism 25 and/or the controllable element 20 are used to expand and/or set an internal volume 85 of the containment chamber 15 such that the chamber comprises a known and desired volume of air (and/or any other suitable gas or fluid). In some such embodiments, one or more vent valves 45, pre-charge valves 40, and/or testing valves 35 can be closed, and one or more devices 75 to be tested are optionally coupled to one or more couplers 60 of the system 10.

In some such embodiments, one or more testing valves 35 are selectively opened and the displacement mechanism and/or controlled member are actuated in a very precise and accurate manner to displace at least some air (or fluid) in the chamber. For instance, in some embodiments in which the displacement mechanism 25 comprises an actuator and the controllable element 20 comprises a piston, the actuator moves the piston into the chamber 15 through very precise and programmed movements to displace at least some of the air (and/or any other suitable gas or other fluid) and/or volume from the chamber, and to force a portion of such air (and/or other fluid) into the device to be tested. In other words, as the test proceeds at least a portion of the contents of the internal volume of the chamber (or of an internal space in the chamber) is transferred to the internal volume of one or more of the devices being tested.

In some cases, by adding only the volume of the internal space of the chamber 15 (or a portion thereof) into an internal cavity of the device 75 that is being tested, the measured pressure is proportional to the internal volume of the internal space of the chamber, less any dead volume between the internal space of the chamber and the internal volume of the device being tested. For instance, if the internal volume of the internal space of the chamber (of the chamber's internal volume) and the internal volume of the device being tested are the same, then pressure should be half (or equal between the internal space of the chamber and the internal volume of the device being tested).

In some cases, as the displacement mechanism 25 (e.g., an actuator) and/or the controllable element 20 (e.g., a piston) modifies the chamber's internal volume (e.g., as the piston moves through the chamber), the system 10 determines a change of the chamber's internal volume (e.g., a space defined between the chamber's inner walls and the controllable element). In some cases, as the test proceeds, some embodiments of the system use one or more sensing units 30 (sensors) to measure one or more characteristics of the system (e.g., a backpressure from the device being tested, mass flow, and/or any other suitable characteristic). In this regard, some embodiments of the system are configured to identify the initial internal volume of the internal space of the chamber and/or the initial pressure of the chamber's contents. Moreover, in some embodiments, the device being tested has its own initial internal volume and/or pressure (e.g., 1 atm) and the backpressure from the device being tested and/or the fill volume of the device being tested can be determined. In such cases, the described system can (via Boyle's law of $P_1V_1=P_2V_2$, the Ideal Gas Law of $Pv=nRT$, and/or in any other suitable method) determine if: a pressure and/or volume of the device being tested drops over time (thus indicating a leak in the device), if a pressure and/or volume of the device indicates an occlusion, and/or if there is another error (or potential error) with any characteristic of the device being tested.

Figure 2:
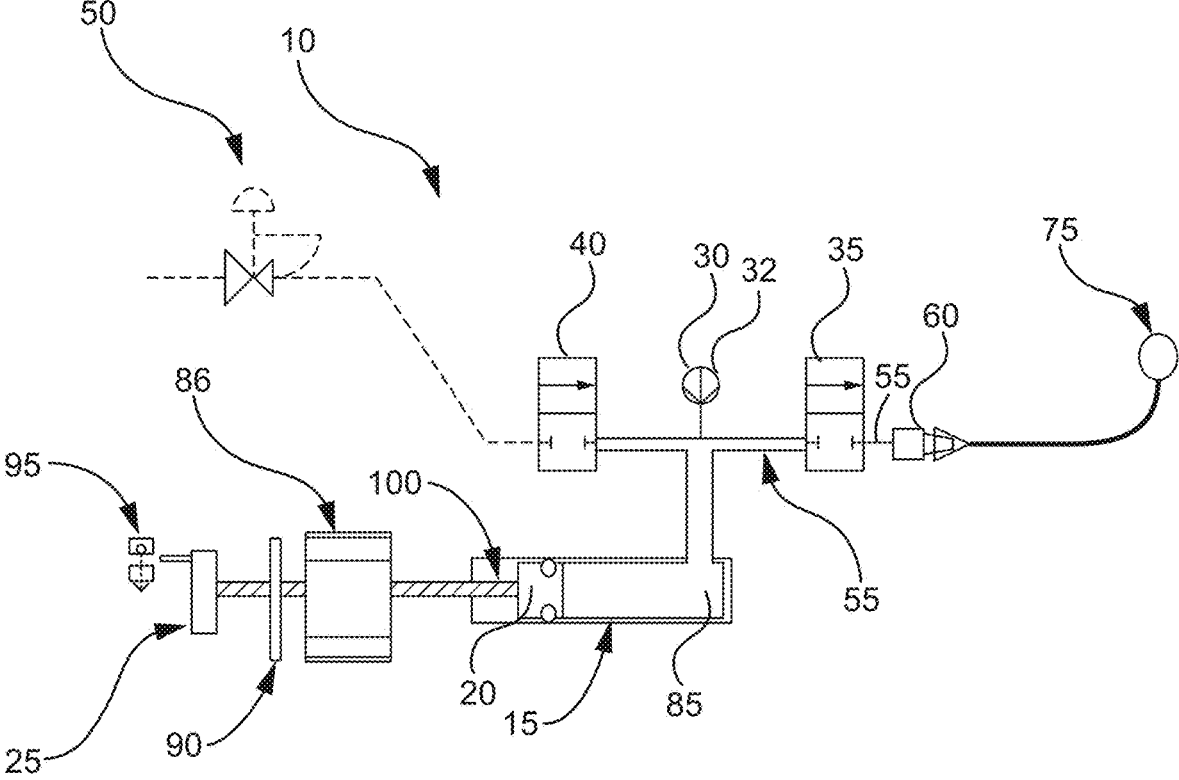
FIG. 2 illustrates a schematic of a volumetric detection system or leak tester, in accordance with a representative embodiment.

With reference now the various components of the volumetric detection system 10, some embodiments of the system 10 comprise one or more containment chambers 15. In such embodiments, the system can comprise any suitable type of chamber 15 that is configured to have the chamber's internal volume be known and be modified by having the displacement mechanism 25 selectively modify the chamber's internal volume through the use of the controllable element 20 (e.g., having the displacement mechanism force a piston to move within the chamber to vary (or displace) an internal volume of the chamber and/or to displace contents of the chamber (e.g., air, nitrogen, argon, hydrogen, water, and/or any other suitable fluid) so as to force at least some of the contents (and/or volume) of the chamber's internal space into the device 75 that is to be tested (e.g., by overcoming at least some backpressure created as at least some of contents of the chamber are forced out of the chamber and/or into the device). Indeed, in some embodiments, the chamber comprises one or more cylinders, rectangular prisms, triangular prisms, polygonal prisms, prisms, bladders, containers, drums, non-flexible containers, flexible containers, and/or any other suitable receptacles that allows the system to function as described herein. By way of non-limiting illustration, FIG. 2 shows that, in some embodiments, the chamber 15 comprises a rigid (or substantially rigid) cylindrical receptable, prismatic container, and/or elongated container.

The chamber 15 can have any suitable maximum internal volume that allows the system 10 to test one or more desired devices 75. Indeed, in some embodiments, the chamber has an internal volume that is smaller than, equal to, and/or greater than the internal volume of the device being tested. In this regard, in some embodiments in which the chamber has an internal volume that is greater than an internal volume of the device that is being tested, the system can be used to increase pressure within the device that is being tested to be higher than 1 atm (e.g., between 1.01 atm and 1,000 atm, or with any suitable subrange thereof.

In some embodiments, the chamber 15 has a maximum internal volume (e.g., a volume when the controllable element 20 (e.g., a piston) is extricated, relaxed, pulled back, or otherwise moved to the maximum desired extent (to provide the chamber with the maximum desired volume) while still remaining at least partially within and/or while still maintaining a seal with and/or of the chamber) that is between about 0.1 cubic centimeter (cc) and 5 liters (l), or within any subrange thereof. Indeed, in some embodiments, the chamber's internal volume has a maximum volume of between about 1 cc and about 150 cc, or within any subrange thereof (e.g., about 60 cc±20 cc). In still other embodiments, the internal space of the chamber has a maximum internal volume of between about 3 cc and about 15 cc, or within any subrange thereof (e.g., about 6 cc±20 cc).

With reference now to the displacement mechanism 25, the system 10 can comprise any suitable mechanism that is configured to actuate or otherwise move one or more controllable elements 20 so as to modify the chamber's internal volume (e.g., to overcome a desired amount of backpressure that is produced as the controllable element modifies the chamber's internal volume, for instance as a piston is driven into the chamber 15). In this regard, some non-limiting examples of suitable displacement mechanisms include one or more actuators, linear actuators (including, without limitation, one or more electro-mechanical actuators, mechanical actuators, hydraulic actuators, electrohydraulic actuators, pneumatic actuators, electric actuators, servo actuators, stepper motors, piezoelectric actuators, supercoiled polymer actuators, motors, mechanical systems, and/or any other suitable actuators that are configured to drive the controllable element (e.g., one or more pistons) back and forth within (and/or in any other suitable manner with respect to) the chamber to modify the chamber's internal volume), pumps and/or vacuums that are configured to move (e.g., translate, inflate, and/or otherwise move) the controllable element to modify the chamber's internal volume, and/or any other suitable device that is configured to modify the chamber's internal volume, with or without the controllable element. Indeed, in some embodiments, the actuator comprises one or more actuators. By way of non-limiting illustration, FIGS. 2-5 show some embodiments in which the displacement mechanism 25 comprises one or more stepper motors 86 and/or screws 100.

In some embodiments in which the system 10 comprises one or more displacement mechanisms 25 (e.g., actuators), one or more portions of the system 10 are configured to precisely identify the chamber's internal volume. While this function can be accomplished in any suitable manner, in some embodiments, the system is configured to determine a position of the controllable element 20 (e.g., a piston) within the chamber 15 (e.g., so as to determine the volume of the internal space between the controllable element (e.g., a face of the piston) and the internal walls of the chamber), a size of bladder that is disposed within chamber and that inflated and/or deflated by the displacement mechanism, the size of bladder that displaces a portion of the chamber's internal volume, and/or in any other suitable manner. Indeed, in some embodiments, the system comprises and/or is otherwise used with one or more computational units 65, programs, software, encoders, sensing units 30, and/or any other suitable items that can identify (or be used to identify) precisely how far the displacement mechanism (e.g., an actuator) has moved the controllable element (e.g., one or more pistons) with respect the chamber.

By way of non-limiting illustration, FIGS. 2-5 show some embodiments, in which the system 10 comprises one or more encoders 90 and/or homing sensors 95. In some such embodiments, the system can determine when the controllable element 20 (e.g., a piston) has been moved to a desired location or reference point so as to "know" where the controllable element (e.g., the piston) is (e.g., as determined by the homing sensor). Additionally, in some embodiments, one or more encoders can determine how many "steps" the stepper motor (or other actuator) has taken (e.g., to determine a position of the controllable element (e.g., piston) and/or a non-displaced internal volume of the chamber). In another embodiment (not illustrated), the system is configured (e.g., via one or more sensors or in any other suitable manner) to determine the size (and hence the volume of displacement) of one or more one bladders and/or any other suitable devices that are disposed in and/or that extend into the chamber and that can be selectively filled with a fluid to modify a size of the device.

In some embodiments in which the displacement mechanism 25 comprises one or more stepper motors 86 and/or other displacement mechanisms that are capable of moving in "steps", the system 10 is configured to identify how many steps the displacement mechanism has taken (and/or will take until the controllable element 20 (e.g., the piston) is moved to the end (and/or another desired portion) of the chamber 15 to displace a maximum amount of the chamber's internal volume). In this regard, the displacement mechanism (e.g., stepper motor and/or other actuator) can (where the displacement mechanism has a rotating portion) take any number of steps per rotation (e.g., of a screw 100 and/or of any other suitable portion of the displacement mechanism), including, without limitation, between about 1 step per rotation and about 5,000 steps per rotation (or within any subrange thereof). Indeed, in some embodiments, the displacement mechanism (e.g., stepper motor) is configured to advance between about 400 and about 1,000 steps per revolution (e.g., 800 steps per revolution ±100 steps per revolution). In still some other embodiments, the displacement mechanism is configured to advance about 600 steps per rotation ±100 steps per rotation.

In some other embodiments, the displacement mechanism 25 is configured to reduce the chamber's internal volume by between about 0.000001 cc and about 10 cm with each step (or within any subrange there, depending on the potential fill volume of the device 75 being tested and/or on the number of devices being tested). Indeed, in some embodiments, the displacement mechanism is configured to reduce the chamber's internal volume by between about 0.0001 cc and about 0.015 cm with each step (e.g., about 0.005 cc±0.005 cc). By way of non-limiting example, in an embodiment in which the chamber 15 and the controllable element 20 (e.g., the piston) define an internal volume of 60 cc and in which the displacement member is configured to take 12,000 steps to move the controllable element its full stroke length, the displacement member is configured reduce the internal volume of the chamber by 0.005 cc with each step (e.g., at 600 steps per rotation). Accordingly, in some embodiments, the described system 10 makes very precise changes in displacement of the internal volume of the chamber so as to look for even minor leaks, occlusions, and/or other defects in one or more devices that are being tested.

With respect to the controllable element 20, the system 10 can comprise any suitable type of controllable element (or member) that is configured to move, change in size, and/or otherwise be actuated (e.g., via the displacement mechanism 25) to modify the chamber's internal volume. Indeed, in some embodiments, the controllable element comprises one or more pistons that form a seal with and that can be moved within the chamber 15, objects (e.g., rods, cylinders, and/or other objects having a known displacement volume, nesting cups that are faced towards each other and that comprise a seal between each other so as to define an interior volume that can be increased and/decreased in size (e.g., as the cups move closer together or further apart) to modify the chamber's internal volume, a bladder that can be inflated and deflated in such a manner so as to modify the chamber's internal volume and to know the current displacement volume of the bladder within the chamber, a diaphragm that can be moved to displace a calculable portion of the chamber's internal volume, and/or any other suitable component that can be actuated (e.g., via the displacement mechanism) to modify the chamber's internal volume.

By way of non-limiting illustration, FIG. 11 shows an embodiment in which the controllable element 20 comprises a rod 24 having a known size that extends through a seal 26 into the chamber 15 such that as the rod moves back and forth in the chamber by known amounts, the chamber's internal volume 85 is also known.

In another non-limiting illustration, FIG. 5 shows an embodiment in which the controllable element 20 comprises a piston 28 that slidably forms a seal with one or more internal walls of the chamber 15 and that is configured to be moved back and forth in the chamber by the displacement mechanism 25. Indeed, in some such embodiments, the piston has an external perimeter that substantially matches the shape and size of an internal perimeter of the chamber (e.g., being circular where the chamber comprises a cylindrical receptacle). Additionally, in some such embodiments, the piston comprises one or more gaskets, rings, and/or any other suitable seals that are configured to ensure that pressure can be maintained within the chamber.

With reference now to the sensing units or sensors 30, the system 10 can comprise any suitable type and number of sensors that allow the system to function as intended. Indeed, in some embodiments, in addition to and/or in place of the encoders 90 and/or homing sensors 95, the system can comprise any other suitable type of sensor, including, without limitation, one or more pressure sensors (e.g., strain gauges, piezoelectric sensors, capacitive sensors, manometers, vacuum pressure sensors, bourdon tube sensors, aneroid barometers, and/or any other suitable pressure sensors), mass flow sensors, temperature sensors, thermometers, movement sensors (e.g., to determine a position of the controllable element), displacement sensors that are configured to determine the displacement of one object with respect to another (e.g., the controllable element with respect to the chamber, and/or the position of any other suitable object with respect to the chamber), and/or any other suitable type of sensors. Indeed, in some embodiments, the system comprises one or more pressure sensors (e.g., strain sensors) that are configured to determine a pressure (e.g., pounds per square inch or PSI) of one or more portions of the system (e.g., before, during, and/or after testing).

Where the system 10 comprises one or more sensing units 30 that comprise a pressure sensor, the pressure sensors can be disposed in any suitable location that allows the system to identify a leak, occlusion, and/or any other applicable defect in a device 75 that is being tested. In this regard, the system can have one or more pressure sensors that are disposed at the chamber 15, between the chamber and the testing valve 35 (e.g., at a dead volume of the system between the chamber's internal volume and an internal volume of the device being tested), between the testing valve 35 and the coupler 60 (or attachment mechanism), and/or in any other suitable location. By way of non-limiting illustration, FIG. 2 show an embodiment in which a pressure sensor 32 is disposed at a conduit 55 that comprises a dead volume (e.g., that is not counted as being the displaceable internal volume of the internal space of the chamber 15) and that extends between the chamber and the testing valve 35. While the pressure sensor can function in any suitable manner, in some embodiments, the pressure sensor is configured to measure internal pressure readings of the chamber and/or backpressure provided by the device being tested (including, without limitation, when one or more testing valves, pre-charge valves 40, and/or vent valves 45 are opened and/or closed).

Where the system 10 comprises one or more sensing unit 30 (e.g., pressure sensors 32), the sensing units can take measurements and/or any other suitable readings at any suitable time, including, without limitation, continuously, continually, and/or intermittently. In some embodiments, however, one or more sensors are configured to gather sensor information on a continual basis. In this regard, the sensors can gather information at any time before, during, and/or after the testing process. Indeed, in some embodiments, one or more sensors are configured to gather information at periods of time that are between about 1 microsecond (μs) and about 5 seconds apart (or within any subrange thereof). For instance, in some embodiments, one or more sensors (e.g., the pressure sensor 32) gather information (e.g., a pressure reading) every 0.1 milliseconds (ms) to every 40 ms, or within any subrange thereof (e.g., between each 1 ms and 20 ms of the testing).

As the sensing units 30 gather information (e.g., relating to the pressure within the chamber 15 and/or backpressure from the device 75 being tested), the system can use such information in any suitable manner, including, without limitation, to identify a leak, an occlusion, and/or any other applicable defect in the device being tested, to store such information, to graphically display such information, to compare such information against set parameters and/or prior test results, to determine a location of the defect, to determine an intensity of the defect, and/or in any other suitable way. Indeed, in some embodiments, the system is configured to create one or more graphs illustrating changes in pressure measurements over time.

By way of non-limiting illustration, FIG. 8 shows an embodiment in which the system 10 provides a graph 102 that displays pressure measurements 105 (e.g., in PSI) on the Y axis and time 110 on the X axis—thereby displaying pressure changes over time (and allowing for the detection of leaks, occlusions, and/or other characteristics of the device (or devices) being tested). In particular, FIG. 8 displays a waveform illustrating pressure that is produced by backpressure from the device being tested during volume transfer (e.g., as the controllable element 20 (e.g., piston) is forced into the chamber 15 to reduce the chamber's internal volume). In so doing, FIG. 8 shows that the graph illustrates changes in the programmable volume 115 of the chamber 15, a fixed volume 120 of the device 75 being tested, a maximum limit gauge pressure (PSIG) 125, and/or a maximum limit PSI decay 130. In some cases, such a graph and/or any particular measurement or measurements can be compared against the graph (and/or other measurements) of an acceptable device (e.g., a device that is free from leaks, occlusions, and/or another particular type of defect). Accordingly, in some embodiments, the system is configured to compare sensing unit (or sensor) readings from devices being tested against saved results from the devices that have passed the test to identify whether the device being tested should pass or fail. Indeed, in some embodiments, the system is calibrated by testing one or more devices that have known characteristics (e.g., a large leak, a very small leak, no leak, a small occlusion, a large occlusion, no occlusion, and/or any other characteristic). In some such embodiments, one or more waveforms, profiles, readings, and/or other information from the known devices can be recorded by the system (or even a system in a remote location), such that the system can then compare waveforms, profiles, signatures, and/or any other suitable characteristic from devices that are being tested (e.g., that have unknown characteristics), with one or more waveforms, profiles, readings, or signatures from devices that have one or more known characteristics. As a result, some embodiments of the system are configured to readily identify one or more characteristics of the device being tested.

Figure 3:
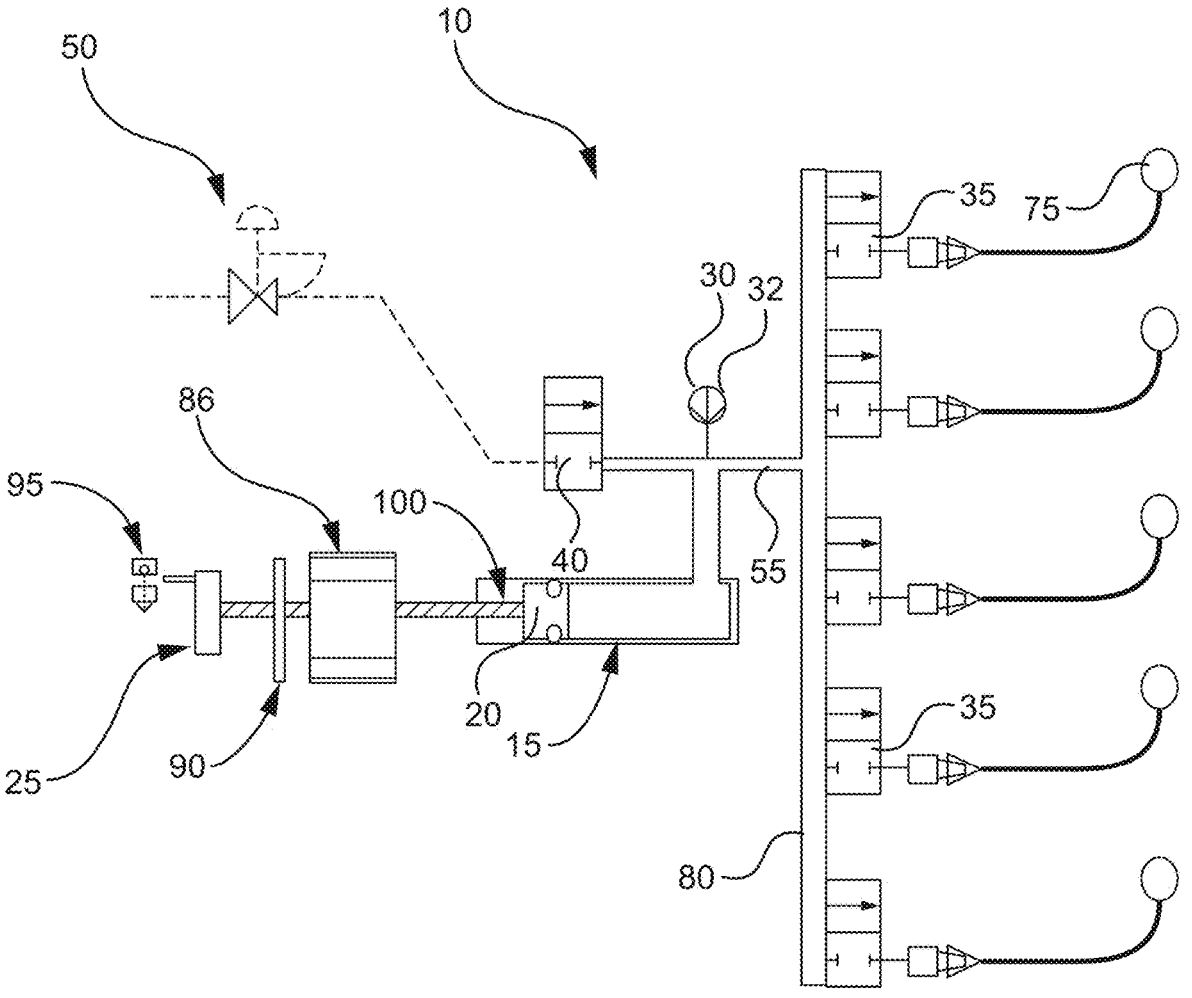
FIG. 3 illustrates a schematic of the volumetric detection system in which the system is configured to test multiple devices simultaneously, in series, and/or in any other suitable manner, in accordance with a representative embodiment.

With respect to the valves (e.g., valves 35, 40, and/or 45), the system 10 can comprise any suitable type of valve that allows the system to function as set forth herein. In this regard, some non-limiting examples of suitable valves include one or more testing valves 35, pre-charge valves 40, vent valves 45, air release valves, air/vacuum valves, combination air valves, butterfly valves, double acting air valves, check valves, triple acting air valves, vacuum breaker air valves, three-way valves, manual valves, automated valves, and/or any other suitable valves. By way of non-limiting illustration, FIGS. 2-3 show some embodiments in which system 10 comprises one or more testing valves 35 and pre-charge valves 45. Additionally, FIG. 5 shows an embodiment in which the system 10 comprises one or more vent valves 40.

Where the system 10 comprises one or more testing valves 35, the testing valves can perform any suitable function, including, without limitation, being: selectively closed to allow for pressure in the chamber 15 to be increased (e.g., via one or more pressure controllers, as described below); being selectively closed to allow for pressure in the chamber to be measured before testing; selectively opened to allow fluid to pass into the device 75 being tested, during testing and while the chamber's internal volume is being displaced due to movement of the controllable element 20 (e.g., piston 28); and/or for any other suitable purpose. Indeed, in some embodiments, the testing valve is configured to open to allow for fluid (e.g., air) to pass into the device being tested when the internal volume of the chamber is decreased by movement of the controllable element (e.g., the piston or rod 28) deeper into the chamber.

Where the system 10 comprises more than one testing valve 35, the testing valves can be in fluid communication with the chamber 15 in any suitable manner, including, without limitation, by each having one or more dedicated conduits to the chamber and/or by being in fluid communication with one or more manifolds 80. By way of non-limiting illustration, FIG. 3 shows that, in some embodiments, more than one testing valve 35 is coupled to a manifold 80 that, in turn, is in fluid communication with the chamber 15.

Where the system 10 comprises more than one testing valve 35, the testing valves can function at any suitable time with respect to each other, including, without limitation, opening and closing simultaneously, opening and closing in series, only having one testing valve opened at a time, having multiple testing valves opened while one or more testing valves are closed, and/or in any suitable manner. Indeed, in some embodiments, the system is configured to only have one testing valve open at a time during device 75 testing. In some other embodiments, however, the system is configured to open two or more testing valves at the same time to provide pressure to multiple devices at the same time.

Where the system 10 comprises one or more vent valves 45, the vent valves can perform any suitable function, including, without limitation, being opened to allow ambient air (and/or any other desired fluid) to enter into the chamber 15 (e.g., when the controllable element 20 is retracted in the chamber to increase the internal volume of the chamber), to vent pressurized fluid (e.g., air) from the system, and/or for any other suitable purpose. Indeed, in some embodiments, the vent valve allows the system to have ambient air enter the chamber (e.g., allowing the chamber to have an initial internal pressure of 1 atm and/or the ambient pressure).

Where the system 10 optionally comprises one or more pre-charge valves 40, the pre-charge valves can perform any suitable function, including, without limitation, allowing the chamber 15 to be pre-pressurized prior to testing. In this regard, while the system can be pre-pressurized in any suitable manner, in some embodiments, one or more fans, blowers, pumps, air compressors, shop air sources, and/or any other suitable pressure controllers 50 are optionally used to increase pressure within the chamber before testing. In this regard, the chamber can be pre-pressurized to any suitable pressure, including, without limitation, to between 1.01 atm and 10 atm, or within any subrange thereof. Indeed, in some embodiments, the chamber is optionally pre-pressurized to between about 1.5 atm and 4 atm. It should be noted that a pressure ratio within the system will increase proportionally to the pressure of the fluid added to the chamber.

Where the system 10 comprises one or more valves (e.g., testing valves 35, pre-charge valves 40, vent valves 45, and/or any other suitable valves), the valves can be controlled in any suitable manner, including, without limitation, manually and/or automatically. Indeed, in some embodiments, one or more valves of the system are configured to be controlled via one or more computational units 65 (or processors), displacement mechanisms, actuators, motors, and/or in any other manner that allows the system to be automated.

With reference now to the couplers 60 (or attachment mechanisms), some embodiments of the system 10 optionally comprise one or more couplers that are capable of forming an airtight seal with the device being tested, with an object housing the device (e.g., container 135, discussed below), a conduit to a device being tested, and/or with any other suitable object that is in fluid communication with the device being tested. In this regard, the system can comprise any suitable type of coupler that is capable of performing such a function. For instance, some non-limiting examples of suitable couplers include one or more Luer tapers, Luer-lock fittings, Luer-slip style connectors, slip tips, one-piece Luer locks, two-piece Luer locks, rotating collar Luer locks, frictional engagements, mechanical engagements, clamps, clasps, catches, seals, quick release couplings, catches, nipples, tapers, gaskets, seals, containers, interfaces, and/or any other mechanism that is suitable for coupling with (and/or of housing) the device that is to be tested and that is configured to allow gas (and/or other fluid) from the chamber to flow into (and/or, in some embodiments, around) the device that is to be tested (e.g., when a corresponding testing vent 35 is opened). Indeed, in some embodiments, the coupler comprises one or more Luer lock couplers.

Where the system 10 comprises one or more couplers 60, the system can comprise any suitable number of couplers, including, without limitation, from 1 to 2,000, or within any subrange thereof. Indeed, in some embodiments, the system comprises 1 to 10 couplers. By way of non-limiting illustration, FIG. 3 shows an embodiment in which the system 10 comprises 5 couplers 60.

Figure 4:
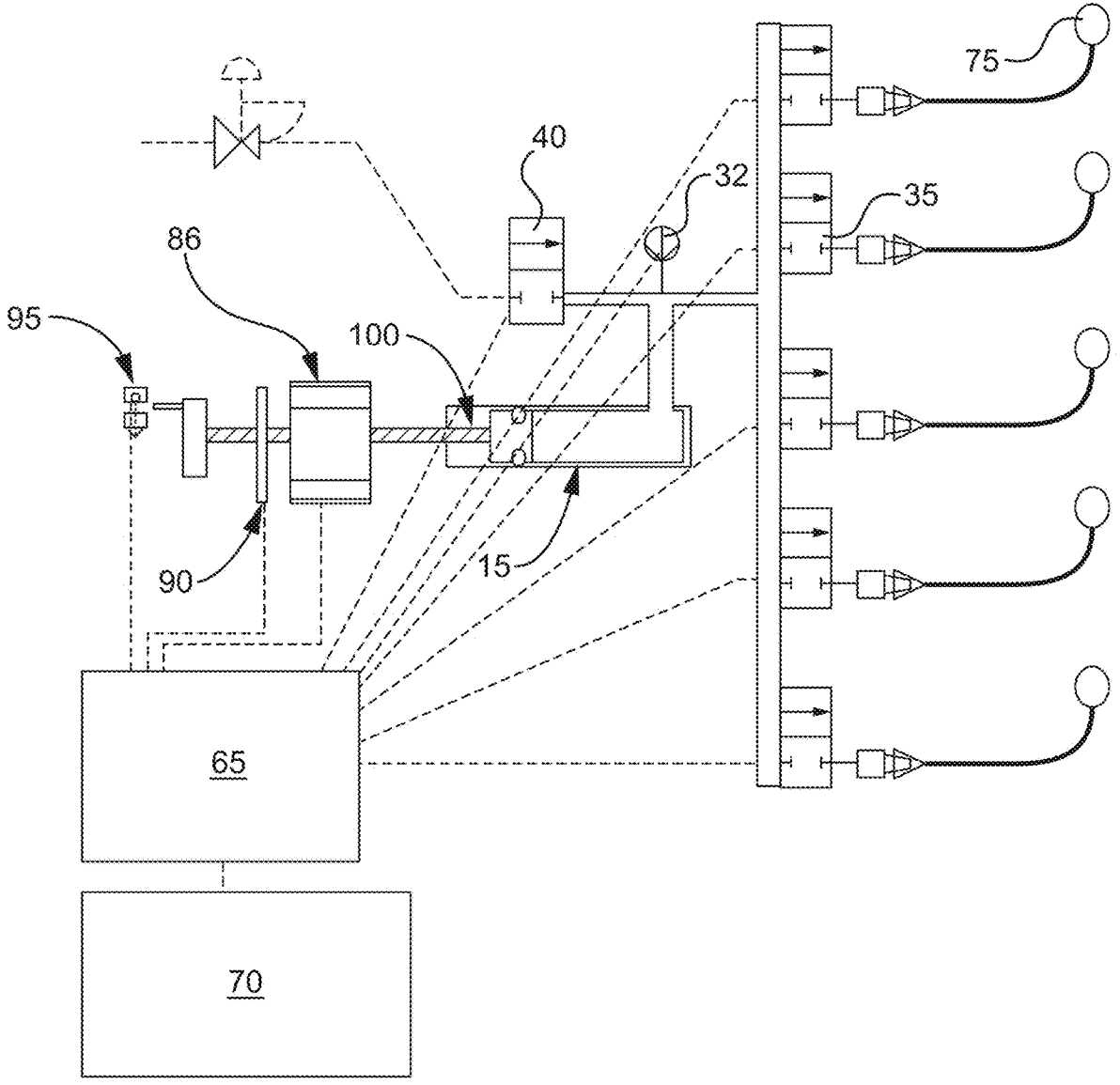
FIG. 4 illustrates a schematic of the volumetric detection system, in accordance with a representative embodiment.

With reference now to the computational units 65 (or processors), some embodiments of the system 10 comprise one or more computational units. While such processors can perform any suitable function, in some embodiments, the system comprises one or more processors, micro-processors, and/or other computational devices (e.g., computer devices 400, as discussed below) that: track the position of the controllable element 20 with respect to the chamber 15; track changes to and the current status of the internal volume of the chamber; control and/or automate the displacement mechanism 25; track sensor 30 readings; modify when sensor readings are taken; control the opening and/or closing of one or more valves; calculate the pressure and/or volume of contents of the device 75 being tested; apply limits (dynamically or otherwise) to one or more features of the system (e.g., limiting movement of the controllable element 20; limit pressure placed on the device being tested; modify the speed of the displacement mechanism 25; control any suitable operation of the system; run programs to test the device being tested, identify problems with such device, run diagnostics on the volumetric detection system itself, and/or to run any other suitable program; generate information and graphical displays of data, calculations, and results relating to the tests performed; and/or perform any other suitable function. Indeed, in some embodiments (e.g., as illustrated in FIG. 4), the computational unit 65 (or processor) controls the displacement mechanism 25, the valves 35, 40, and/or 45; receives information from the sensors 30; and runs calculations to identify potential defects in one or more devices 75 being tested.

With reference now to the displays 75, some embodiments of the system 10 optionally comprise (or are otherwise configured to be in signal communication with) one or more monitors, screens, projectors, touchscreens, computers, smartphones, tablets, handheld devices, and/or other displays. In this regard, while the system can be in wired or wireless communication with one or more displays, in some embodiments, a display (e.g., a touchscreen) is disposed on the volumetric detection system 10 itself (e.g., as shown by display 70 in FIG. 4).

In addition to, or in place of, one or more of the aforementioned characteristics and components, the described system 10 can be modified in any suitable manner. For instance, in some embodiments, the described system is configured to check for leaks (or to otherwise detect specific characteristics) in devices 75 that are being tested and that are not flexible and/or that are not configured to be inflated. For instance, in some embodiments, the described system is used to determine if there are any leaks in (or other characteristics associated with) a watch, phone, package, sealed device, and/or any other suitable product.

While the system 10 can check for leaks (or other characteristics) in such devices 75 in any suitable manner, in accordance with some embodiments, FIG. 7 shows that a device 75 is placed in a container 135 having a known internal volume (e.g., $V_2$—the initial internal volume of the chamber being $V_1$ when referencing Boyle's Law). In some cases, such container is disposed within, can be inserted into (as illustrated in FIGS. 6 and 7), and/or is otherwise in fluid communication with the volumetric detection system 10. In some such embodiments, the device being tested is sealed within the container and the controllable element 20 (e.g., piston 28) is forced though the chamber 15 so as to increase pressure within the container. Moreover, in some such embodiments, if the device being tested has a leak in it, air and/or any other suitable fluid from the chamber will leak into the device, such that pressure in the container drops (e.g., as identified by a pressure sensor 23 that is between the chamber and the container, in the container, and/or in any other suitable location).

As yet another example of a suitable modification, instead of having one chamber 15, controllable element 20, and/or displacement mechanism 25 in the system 10, some embodiments of the system include any suitable number of any element described herein. For instance, some embodiments comprise multiple chambers 15 and controllable elements with corresponding sensing units 30 and conduits 55 to their respective testing valves 35.

In addition to the foregoing, the described system 10 can have any other suitable feature. Indeed, in some embodiments, the described system is configured to pressurize air (and/or any other suitable fluid) solely by forcing the controllable element 20 (e.g., piston 28 or rod 24) through the chamber 15 to modify the chamber's internal volume. As a result, some embodiments of the system are "airless" or function without the use of any external pressurized air source.

As another example, some embodiments of the described system are configured to be coupled to more than the device 75 that is being tested. As a result, some such embodiments can greatly decrease the time needed to test such devices (e.g., when compared to some competing systems).

In still another example, the described system 10 can be programmed to use finite volumes within the chamber 15 for volume displacement to allow for an adiabatic phenomena to be nullified.

The described system 10 can also be made in any suitable manner. In this regard, some non-limiting examples of methods for making the described volumetric detection system and its accompanying components include stamping; molding; extruding; punching; cutting; filing; 3D printing; additive manufacturing; plaining; shaping; bending; connecting various pieces with one or more adhesives, mechanical fasteners (e.g., nails, staples, pegs, clips, clamps, rivets, crimps, pins, brads, magnets, hook and loop fasteners, straps, ties, bindings, and/or any other suitable fasteners), friction fits, mechanical fits, welds, soldering joints, and/or melted joints; and/or any other suitable method that allows the described system to perform its intended functions.

Thus, as discussed herein, the described systems and methods relate to product quality control. More particularly, some embodiments of the described systems and methods relate to a volumetric detection system that is configured to generate pressure by displacing a volume of an internal space in a containment chamber and using the generated pressure to inflate and/or otherwise test one or more products (e.g., balloon catheters and/or any other products that are supposed to be substantially gas impermeable) for leaks, ingress egress, pressure decay, mass flow, changes in volume, changes in pressure, check valve opening pressure with peak hold, specification verification, specification validation, and/or any other suitable characteristic. While the described volumetric detection system can have any suitable feature, in some cases, it includes one or more containment chambers that each have an internal space; displacement mechanisms (e.g., programmable stepper motors, servos, pumps, and/or any other suitable actuating mechanisms that can be actuated to modify a volume of the chamber's internal space); controllable elements (e.g., pistons that are coupled to the displacement mechanism and that are configured to be moved within the containment chamber to selectively and precisely modify the volume of the containment chamber's internal space); sensing units (e.g., sensors) that are configured to measure a pressure of the chamber's internal space, a backpressure from a device that is being tested, a volume of the internal space in the containment chamber, and/or any other variable related to an internal condition of the containment chamber and/or a condition of a device being tested; computational units (e.g., processors) that (among other things) are configured to determine a current volume of the internal space of the chamber (e.g., based on placement of the piston within the chamber), and/or an attachment mechanism or coupler that is configured to couple to the device that is to be tested. In some cases, the described detection unit (or tester) functions without being coupled to an external compressed air source (e.g., an air compressor or shop air source). Thus, in some cases, the detection system can be considered to be "airless".

Representative Operating Environment

As mentioned previously, some embodiments of the described system 10 are configured to be controlled via and/or operated with one or more computational units or processors. In this regard, the described system 10 can be used with, or in, any suitable operating environment and/or software. In this regard, FIG. 9 and the corresponding discussion are intended to provide a general description of a suitable operating environment in accordance with some embodiments of the described systems and methods. As will be further discussed below, some embodiments embrace the use of one or more processing (including, without limitation, micro-processing) units in a variety of customizable enterprise configurations, including in a networked configuration, which may also include any suitable cloud-based service, such as a platform as a service or software as a service.

Some embodiments of the described systems and methods embrace one or more computer readable media, wherein each medium may be configured to include or includes thereon data or computer executable instructions for manipulating data. In accordance with some embodiments, the computer executable instructions include data structures, objects, programs, routines, and/or other program modules that can be accessed by one or more processors, such as one associated with a general-purpose processing unit capable of performing various different functions or one associated with a special-purpose processing unit capable of performing a limited number of functions (e.g., the computational unit or processor 65). In this regard, in some embodiments, the computational unit (e.g., as mentioned above) comprises a specialized processor 65 that is configured for use with the described system 10.

Computer executable instructions cause the one or more processors of the enterprise to perform a particular function or group of functions and are examples of program code means for implementing steps for methods of processing. Furthermore, a particular sequence of the executable instructions provides an example of corresponding acts that may be used to implement such steps.

Examples of computer readable media (including non-transitory computer readable media) include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing unit.

With reference to FIG. 9, a representative system includes computer device 400 (e.g., one or more processors), which may be a general-purpose or special-purpose computer (or processing unit). For example, computer device 400 may be one or more processors, personal computers, notebook computers, PDAs or other hand-held devices, workstations, minicomputers, mainframes, supercomputers, multi-processor systems, network computers, processor-based consumer devices, cellular phones, tablet computers, smart phones, feature phones, smart appliances or devices, control systems, or the like.

Computer device 400 includes system bus 405, which may be configured to connect various components thereof and enables data to be exchanged between two or more components. System bus 405 may include one of a variety of bus structures including a memory bus or memory controller, a peripheral bus, or a local bus that uses any of a variety of bus architectures. Typical components connected by system bus 405 include processing system 410 and memory 420. Other components may include one or more mass storage device interfaces 430, input interfaces 440, output interfaces 450, and/or network interfaces 460, each of which will be discussed below.

Processing system 410 includes one or more processors, such as a central processor and optionally one or more other processors designed to perform a particular function or task. It is typically processing system 410 that executes the instructions provided on computer readable media, such as on the memory 420, a magnetic hard disk, a removable magnetic disk, a magnetic cassette, an optical disk, or from a communication connection, which may also be viewed as a computer readable medium.

Memory 420 includes one or more computer readable media (including, without limitation, non-transitory computer readable media) that may be configured to include or includes thereon data or instructions for manipulating data and may be accessed by processing system 410 through system bus 405. Memory 420 may include, for example, ROM 422, used to permanently store information, and/or RAM 424, used to temporarily store information. ROM 422 may include a basic input/output system ("B IOS") having one or more routines that are used to establish communication, such as during start-up of computer device 400. RAM 424 may include one or more program modules, such as one or more operating systems, application programs, and/or program data.

One or more mass storage device interfaces 430 may be used to connect one or more mass storage devices 432 to the system bus 405. The mass storage devices 432 may be incorporated into or may be peripheral to the computer device 400 and allow the computer device 400 to retain large amounts of data. Optionally, one or more of the mass storage devices 432 may be removable from computer device 400. Examples of mass storage devices include hard disk drives, magnetic disk drives, tape drives, solid state mass storage, and optical disk drives.

Examples of solid-state mass storage include flash cards and memory sticks. A mass storage device 432 may read from and/or write to a magnetic hard disk, a removable magnetic disk, a magnetic cassette, an optical disk, or another computer readable medium. Mass storage devices 432 and their corresponding computer readable media provide nonvolatile storage of data and/or executable instructions that may include one or more program modules, such as an operating system, one or more application programs, other program modules, or program data. Such executable instructions are examples of program code means for implementing steps for methods disclosed herein.

One or more input interfaces 440 may be employed to enable a user to enter data (e.g., initial information) and/or instructions to computer device 400 through one or more corresponding input devices 442. Examples of such input devices include a keyboard and/or alternate input devices, such as one or more switches, buttons, dials, sensors (e.g., pressure sensors (such as strain gauges, piezoelectric sensors, capacitive sensors, manometers, vacuum pressure sensors, bourdon tube sensors, aneroid barometers, and/or any other suitable pressure sensors), mass flow sensors, temperature sensors, thermometers, movement sensors (so as to determine a position of the controllable element), displacement sensors that are configured to determine the displacement of one object with respect to another (G-force sensors, RPM sensors, and/or any other suitable type of sensors, including, without limitation, those discussed elsewhere herein), digital cameras, pin pads, touch screens, mice, trackballs, light pens, styluses, or other pointing devices, microphones, joysticks, game pads, scanners, camcorders, and/or other input devices. Similarly, examples of input interfaces 440 that may be used to connect the input devices 442 to the system bus 405 include a serial port, a parallel port, a game port, a universal serial bus ("USB"), a firewire (IEEE 1394), a wireless receiver, a video adapter, an audio adapter, a parallel port, a wireless transmitter, or another interface.

One or more output interfaces 450 may be employed to connect one or more corresponding output devices 452 to system bus 405. Examples of output devices include a monitor or display screen, a speaker, a wireless transmitter, a printer, and the like. A particular output device 452 may be integrated with or peripheral to computer device 400. Examples of output interfaces include a video adapter, an audio adapter, a parallel port, and the like.

One or more network interfaces 460 enable computer device 400 to exchange information with one or more local or remote computer devices, illustrated as computer devices 462, via a network 464 that may include one or more hardwired and/or wireless links. Examples of the network interfaces include a network adapter for connection to a local area network ("LAN") or a modem, BLUETOOTH™, Wi-Fi, a cellular connection, a wireless link, or another adapter for connection to a wide area network ("WAN"), such as the Internet. The network interface 460 may be incorporated with or be peripheral to computer device 400.

In a networked system, accessible program modules or portions thereof may be stored in a remote memory storage device. Furthermore, a networked system computer device 400 may participate in a distributed computing environment, where functions or tasks are performed by a plurality of networked computer devices. While those skilled in the art will appreciate that the described systems and methods may be practiced in networked computing environments with many types of computer system configurations, FIG. 10 represents an embodiment of a portion of the described systems (e.g., the volumetric detection system 10) in a networked environment that includes clients (465, 470, 475, etc.) connected to a server 485 via a network 460. While FIG. 10 illustrates an embodiment that includes three clients (e.g., the described volumetric detection system) connected to the network, alternative embodiments include at least one client connected to a network or many clients connected to a network. Moreover, embodiments in accordance with the described systems and methods also include a multitude of clients throughout the world connected to a network, where the network is a wide area network, such as the Internet. Accordingly, in some embodiments, the described systems and methods can allow for remote: monitoring, training, communication, observation, control, adjustment, troubleshooting, data collecting, system optimization, user interaction, comparison, and/or other controlling of the described system 10 from one or more places throughout the world.

The described systems and methods may be embodied in other specific forms without departing from their spirit or essential characteristics. The described embodiments, examples, and illustrations are to be considered in all respects only as illustrative and not restrictive. The scope of the described systems and methods is, therefore, indicated by the appended claims rather than by the foregoing description. All changes that come within the meaning and range of equivalency of the claims are to be embraced within their scope. Moreover, any component and characteristic from any embodiments, examples, and illustrations set forth herein can be combined in any suitable manner with any other components or characteristics from one or more other embodiments, examples, and illustrations described herein.

In addition, as the terms on, disposed on, attached to, connected to, coupled to, etc. are used herein, one object (e.g., a material, element, structure, member, etc.) can be on, disposed on, attached to, connected to, or otherwise coupled to another object—regardless of whether the one object is directly on, attached, connected, or coupled to the other object, or whether there are one or more intervening objects between the one object and the other object. Also, directions (e.g., front back, on top of, below, above, top, bottom, side, up, down, under, over, upper, lower, lateral, right-side, left-side, base, etc.), if provided, are relative and provided solely by way of example and for ease of illustration and discussion and not by way of limitation. Where reference is made to a list of elements (e.g., elements a, b, c), such reference is intended to include any one of the listed elements by itself, any combination of less than all of the listed elements, and/or a combination of all of the listed elements. Furthermore, as used herein, the terms a, an, and one may each be interchangeable with the terms at least one and one or more. Moreover, any component, element, and/or characteristic from any embodiments, cases, iterations, implementations, examples, Figures, and illustrations set forth herein can be combined in any suitable manner with any other components or characteristics from one or more other embodiments, cases, iterations, implementations, examples, Figures, and illustrations described herein. Additionally, uses of terms such as other or another are not to be considered to exclude any other embodiment, case, implementation, iteration, characteristic, or example.

What is claimed is:

1. A volumetric detection system, comprising:
a containment chamber having an internal space;
a controllable element that is configured to be selectively moved to modify a volume of the internal space;
a displacement mechanism that is configured to precisely move the controllable element to modify the volume of the internal space;
a sensing unit that is configured to measure a characteristic of the containment chamber;
a computational unit that is configured to analyze at least one of (i) a position and (ii) a status of the controllable element; and
a first coupler that is configured to couple to a first device that is to be tested such that the first device is in fluid communication with the containment chamber.

2. The detection system of claim 1, wherein the computational unit is configured to track a backpressure from the first device to provide a graphical display of a change in the backpressure over time.

3. The detection system of claim 1, wherein the sensing unit is configured to measure a pressure within the containment chamber, and wherein the computational unit is configured to compare a change in a backpressure of the first device over time with an expected pressure change over time.

4. The detection system of claim 1, wherein the displacement mechanism comprises a stepper motor that is coupled to an encoder that determines a position of the controllable element within the containment chamber.

5. The detection system of claim 1, further comprising a first testing valve that is disposed between the containment chamber and the first coupler, wherein the first testing valve is configured to selectively open and close under a control of the computational unit.

6. The detection system of claim 5, further comprising a second coupler and a second testing valve, wherein the second testing valve is disposed between the containment chamber and the second coupler, and wherein the second testing valve is configured to open and close under the control of the computational unit.

7. The detection system of claim 5, further comprising a pre-charge valve that is configured to be selectively opened for pressurization of contents of the containment chamber before the first testing valve is opened to allow for a test of the first device.

8. The detection system of claim 1, wherein the computational unit is configured to determine an internal volume of the containment chamber, as defined by the controllable element and the containment chamber, to within between 0.0001 cc and 0.01 cc.

9. A volumetric detection system, comprising:
a containment chamber having an internal space;
a controllable element that is configured to be forced to move through the containment chamber to modify a volume of the internal space;
a program-controlled displacement mechanism that is coupled to the controllable element and that is configured to precisely move the controllable element to modify the volume of the internal space;
a first attachment mechanism that is configured to be in fluid communication with the containment chamber and that is configured to couple to a first device that is to be tested;
a first testing valve that is disposed between the containment chamber and the first attachment mechanism to selectively block and selectively allow a first fluid flow between the containment chamber and the first attachment mechanism;
a first sensing unit that is configured to determine a location of the controllable element with respect to the containment chamber to determine the volume of the internal space;
a second sensing unit that is configured to measure a backpressure provided by the first device when the controllable element is advanced into the containment chamber and when the first device is coupled to first attachment mechanism; and
a computational unit that is configured to track the backpressure.

10. The detection system of claim 9, further comprising the first device, the first device comprising a first inflatable device that is coupled to the first attachment mechanism, wherein the second sensing unit is configured to measure the backpressure from the first device when the first testing valve is open to allow the first fluid flow from the containment chamber to the first inflatable device.

11. The detection system of claim 9, further comprising a pre-charge valve that is configured to be selectively opened while the first testing valve is closed to allow contents of the containment chamber to be pressurized prior to allowing contents of the containment chamber to be forced through the first testing valve into the first device.

12. The detection system of claim 9, further comprising:
a second attachment mechanism; and
a second testing valve,
wherein the second testing valve is disposed between the containment chamber and the second attachment mechanism, and
wherein the second testing valve is configured to selectively open and close under a control of the computational unit to control a second flow of fluid from the containment chamber into a second device.

13. The detection system of claim 9, wherein the volumetric detection system is configured to introduce a first fluid from the first fluid flow from within the containment chamber into the first device and not to introduce a second fluid from a fluid source that is external from the volumetric detection system.

14. A method for testing a first device, the method comprising:

obtaining volumetric detection system, comprising:

a containment chamber having an internal space;

a controllable element that is configured to be selectively moved to modify a volume of the internal space;

a displacement mechanism that is configured to precisely move the controllable element to modify the volume of the internal space;

a sensing unit that is configured to measure a characteristic of the containment chamber;

a computational unit that is configured to analyze at least one of (i) a position and (ii) a status of the controllable element; and a first coupler that is configured to couple to a first device that is to be tested such that the first device is in fluid communication with the containment chamber;

coupling the first device to the first coupler to form an air-tight seal between the first device and the first coupler;

using the displacement mechanism to automatically advance the controllable element into the containment chamber to pass a portion of a fluid from the containment chamber into the first device to be tested; and measuring a backpressure of the first device.

\* \* \* \* \*